INVENTOR
JOSEPH FRANKLIN JONES, JR.
BY Cushman, Darby & Cushman
ATTORNEYS

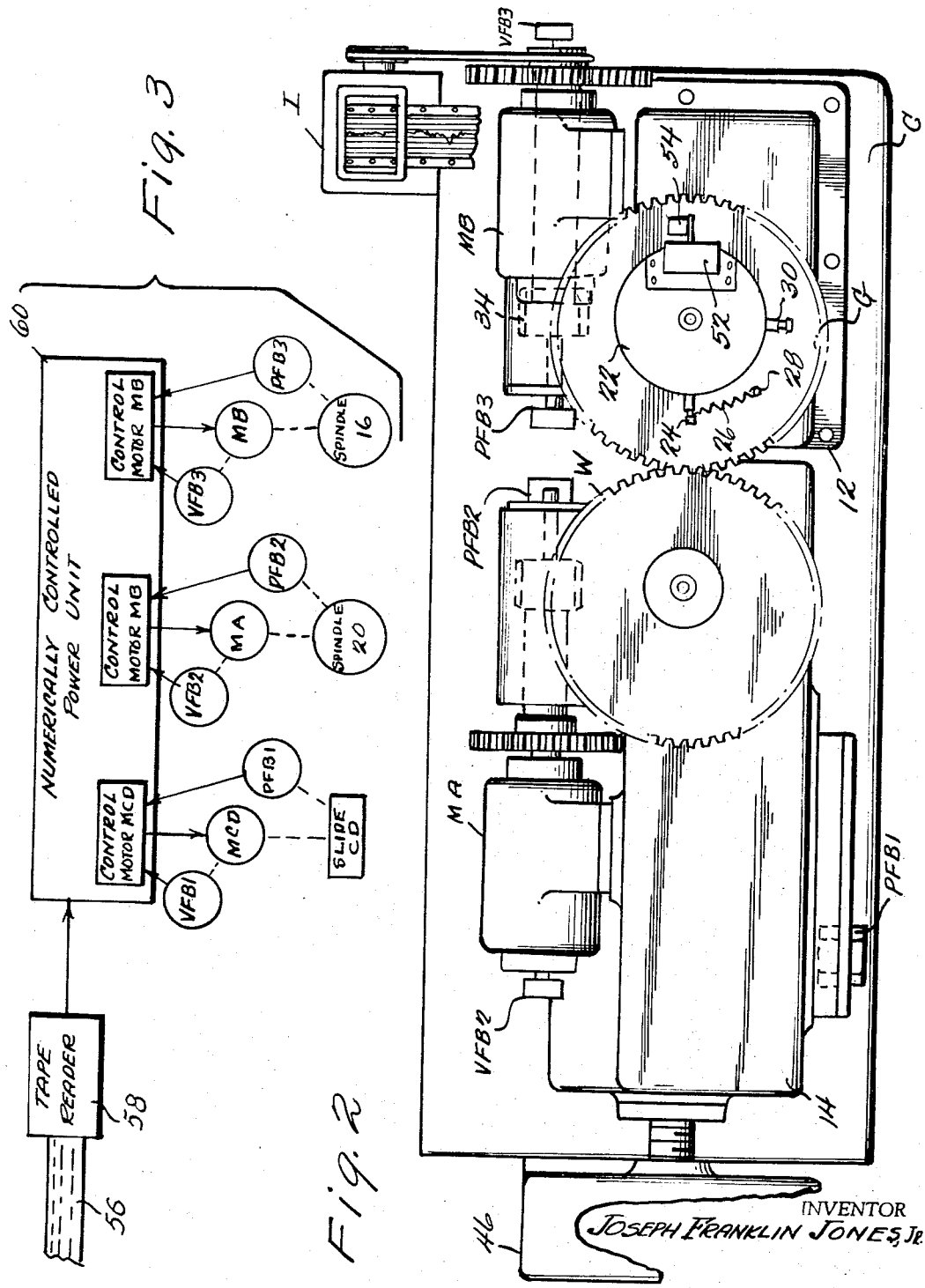

United States Patent Office 3,358,374
Patented Dec. 19, 1967

3,358,374
MEASURING AND INSPECTING DEVICE FOR GEARS AND THE LIKE
Joseph Franklin Jones, Jr., Springfield, Vt., assignor to The Fellows Gear Shaper Company, Springfield, Vt., a corporation of Vermont
Filed June 25, 1965, Ser. No. 466,989
6 Claims. (Cl. 33—179.5)

ABSTRACT OF THE DISCLOSURE

A gear inspection apparatus is provided with means for intermeshing and rotating a work gear relative to a master gear so as to measure and record deviations in tooth form of the work gear. Means are also provided for automatically moving one of the gears laterally with respect to the other in accordance with a programmed sequence so that eccentric gears and arcuate or non-circular gears can be maintained in intermeshing engagement with a master gear for inspection and measurement.

Figure 1:
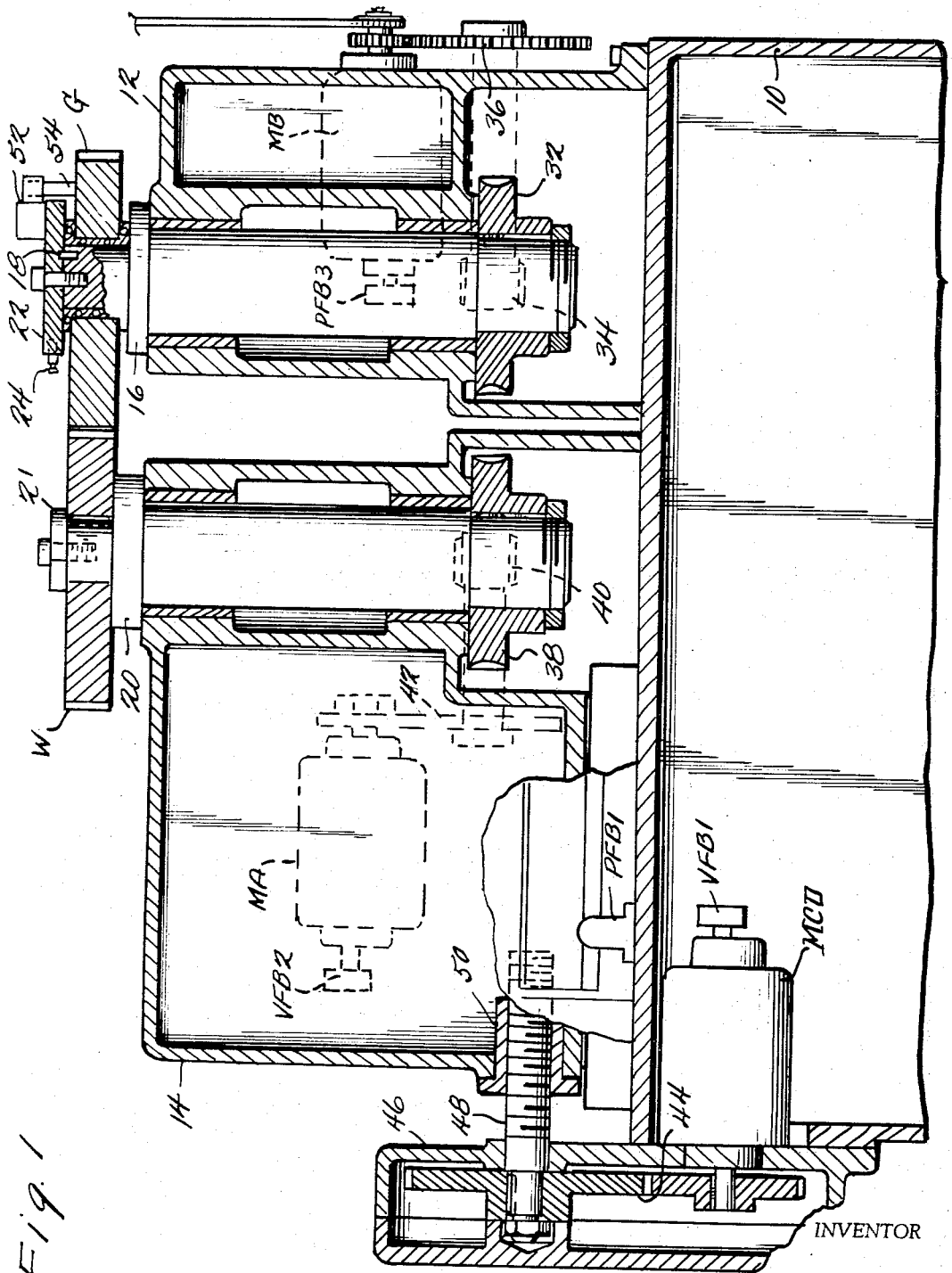

The present invention relates generally to a measuring and inspecting device and, more particularly, is concerned with an instrument for inspecting a gear by comparing the actual angular position of the gear as determined by its rotation in mesh with a master gear with the exactly desired angular position as determined by a prepared punched control tape. The device may be employed to measure either circular or noncircular gears by selecting the proper master gear and proper tape. It will be obvious that in place of a master gear the cutter used to produce the gear may be employed as a master.

Accordingly, a principal object of the present invention is to provide an improved means for measuring and inspecting gears.

Another object of the present invention is to provide an improved apparatus for accurately measuring any discrepancy in the tooth form of a gear.

A further object of the present invention is to provide an improved device for accurately measuring and inspecting both circular and noncircular gears.

An additional object of the present invention is to provide a versatile gear measuring and inspecting device which will accurately measure and graphically reflect any discrepancy or deviation in the tooth form of a gear from a predetermined standard.

Another object of the present invention is to provide a device which will accurately measure and indicate any deviation of a circular or noncircular work gear from a predetermined form.

Other objects and the entire scope of the present invention will become apparent from the following detailed description and by reference to the accompanying drawings.

It should be understood, however, that the detailed description and specific examples, while indicating preferred embodiments of the invention, are given by way of illustration, since various changes and modifications within the spirit and scope of the invention will become apparent as the description herein progresses. Reference now is being made to the accompanying drawings which form a part hereof, wherein:

FIGURE 1 is a cross section taken through the device embodying the present invention;

FIGURE 2 is a plan view of the device shown in FIGURE 1, illustrating the measurement of a non-circular gear as an example; and FIGURE 3 shows schematically the arrangement of the various electrical control units taken in conjunction with a tape being fed through a reading device for the tape. This figure shows in a new combination an arrangement of conventional units made in accordance with the present invention so as to obtain the desired measurements.

As shown in FIGURES 1 and 2, a base 10 is provided. On this base 10 is mounted a housing member 12 which is fixed in position on the base. Also on the base 10 is a housing member 14 which is slideable on the base 10 so that it may be moved laterally toward and away from the housing member 12.

In the housing member 12 is mounted a rotatable spindle 16. In the present example, this spindle 16 carries a master gear G. This master gear G is freely rotatable on the spindle 16.

A spindle 20 is mounted in the housing member 14. On its upper end, this spindle 20 carries a work gear W which is keyed by key means 21 to the spindle 20.

As shown in FIGURES 1 and 2, the work gear W is in mesh with the master gear G. A plate member 22 holds the master gear G on the spindle 16. The plate 22 is pinned to spindle 16 by pin means 18 so as to prevent relative rotation between the plate 22 and the spindle 16. This plate member 22 carries a pin 24 to which is affixed a spring member 26 which in turn, at its other end, is fixed a pin 28 on the master gear G. This spring 26 urges th emaster gear G in a given direction so that one side of the teeth on the master gear will be urged against a given side of the teeth of the work gear W. If it is desired to measure the other side of the teeth of the work gear W, the spring 26 is removed from pin 24 and placed on the pin 30 also carried by the plate 22.

The lower end of spindle 16 carries a worm gear 32, which is rotated by means of a worm 34. The worm 34 is driven by the motor MB through a suitable mechanical motion and power transmitting connection means 36.

The lower end of spindle 20 carries a worm gear 38 which is driven by means of a worm 40. The worm 40 is rotatably driven by the motor MA through a suitable motion and power transmitting connection means 42.

As shown in FIGURE 2, the motor MA has mounted on one end thereof a velocity feed back unit which is basically a tachometer VFB2 with electrical functions.

On one end of motor MB is mounted a tachometer or velocity feed back unit VFB3.

Also mounted on the shaft of motor MB is a position feed back unit PFB3. Mounted on the shaft of motor MA is a position feed back unit PFB2.

Mounted on the base 10 and arranged so as to maintain the correct lateral position of the housing 14 is a position feed back unit PFB1. This element is known in the art as a linear transducer. Motion is imparted to the housing 14 from the motor MCD which actuates the gearing 44 mounted in housing 46. The gearing 44 is arranged so as to rotate the feed screw 48 upon rotation of a motor MCD as will be apparent from FIGURE 1. The feed screw 48 is threaded into a nut member 50 fixed against any movement with respect to the housing 14. It will be clear therefore, that actuation of the motor MCD and consequent rotation of the feed screw 48 will serve to feed the housing 14 toward or away from the housing 12.

These position feed back units PFB1, PFB2 and PFB3, and velocity feed back units VFB1, VFB2 and VFB3 are known in the art as synchro resolvers.

On the spindle 16 is mounted a transducer 52 which is a unit, as is well known in the art, for converting mechanical motion to electrical measurements. The transducer 52 has a feeler member 54 which will be actuated upon movement of the master gear G from its proper position. Any such movement of the master gear G will be due to inaccuracies in the gear W being measured. Motion of the feeler member 54 will be converted in a manner well known in the art to an electrical indicator I which is shown in FIGURE 2.

In FIGURE 3, as the tape 56 is fed through the tape reader 58, a signal is given to a numerically controlled power unit 60. This numerically controlled power unit decodes the tape and tells the control for motor MCD to move. The motor MCD receives impulses from its control and moves, which will cause the housing 14 to move. As the housing 14 moves, it will position or displace the position feed back unit PFB1 which is in engagement with the housing 14. This position feed back unit indicates to the control for motor MCD the exact location of the housing 14 and will tell the motor how to move. When the position feed back unit agrees with the original command given to the control for motor MCD, the necessary information has been communicated and executed as far as positioning of the housing 14 is concerned.

The velocity feed back unit VFB1 controls the speed of rotation of the motor MCD and is driven off the motor as indicated in FIGURE 1. This unit tells the motor MCD to speed up or slow down in accordance with commands from the tape.

In a similar manner, the numerically controlled power unit decodes and commands the controls for motors MA and MB.

It will be seen that in practice the center distance between spindles 20 and 16 and the rotative motion of the spindles 20 and 16 are controlled by three motors which are in turn controlled by the tape 50 being fed into the tape reader 56. When in operation, the master gear G in its rotation is commanded by the tape as is the work gear W. By means of the intermeshing teeth on the work gear W and the master gear G, the master gear is rotated. Also the master gear spindle 16 is rotated as commanded by the tape. Any deviation in position of the work gear W on the work spindle 20 relative to the master gear G is picked up by the transducer 52 referred to above, and is recorded as a deviation from a straight line on the indicator I.

This deviation will be due to any difference between the rotation imparted to the master gear G by the teeth intermeshing with work gear teeth and the rotation given to the master gear spindle 16 through its tape controlled rotation. Such a deviation will be due to any inaccuracies in the work gear W and will be shown by a deviation from a straight line on the chart of the indicator I, as is well known in the gear measuring field.

If it is desired to measure a noncircular gear, the center distance between spindles 20 and 16 is varied as the gears revolve as determined by the tape being fed into the tape reader. If a circular gear is being measured, this center distance will be maintained constant. It is also possible to use a non-circular master gear to measure a non-circular work gear and maintain a constant center distance.

It will be apparent from the above that the rotation of the two spindles 20 and 16 and their velocity are controlled from the tape 56 being fed into the tape reader 58 which in turn controls the numerical power unit and the various motor controls. The work gear W being keyed to the work spindle 20 is held in its angular position. The master gear G being free to rotate on its spindle 16 will be controlled by the intermeshing teeth on it, and the work gear insofar as its angular position and velocity are concerned. Any deviation from the correct position as defined by the tape 50 will be reflected in a change of angular position of the master gear G on the master gear spindle 16. This change of angular position will be reflected through the transducer 52 to the chart on the indicator I. This combination is new and will accurately measure any discrepancy in the tooth form of the work gear.

Obviously, the positions of the work gear and the master gear are interchangeable since it is immaterial insofar as the present case is involved as to which spindle carries the work gear and which carries the master gear.

It will thus be seen that the objects of this invention have been fully and effectively accomplished. It will be realized, however, that the foregoing specific embodiments have been shown and described only for the purpose of illustrating the principles of this invention, and are subject to extensive change without departure from such principles. Therefore, this invention includes all modifications encompassed within the spirit and scope of the following claims.

What is claimed is:

1. An apparatus for inspecting a work gear so as to determine the presence and degree of any deviation in the tooth form thereof from the tooth form of a master gear comprising in combination: a base means; a first housing means slidably carried by said base means; a second housing means fixedly carried by said base; a first spindle means mounted in said first housing means so as to be rotatable about a first axis of rotation; a second spindle means mounted in said second housing means so as to be rotatable about a second axis of rotation spaced from, and parallel to, said first axis of rotation; said first spindle means being adapted to fixedly mount on of said gears for rotation therewith; said second spindle means being adapted to rotatably mount the other gear so that said other gear will be free to rotate relative to said second spindle means and in meshing alignment with the gear mounted on said first spindle means; a sensing means operatively associated with said second spindle means and the gear rotatably mounted thereon operatively responsive to relative rotational movement between said second spindle means and the gear mounted thereon; indicator means actuated by said sensing means; first, second, and third motive means, said first motive means being operatively connected to the first spindle means to effect rotation thereof, said second motive means being operatively connected to the second spindle means to effect rotation thereof, and said third motive means being operatively connected to the first housing member to impart lateral movement thereof to effect meshing of the gears mounted on said first and second spindle means; and motive control means for controlling and coordinating said first, second, and third motive means so as to automatically maintain said gears in continuous mesh during an inspection operation and so as to impart predetermined rotation to said first and second spindle means, whereby the gear carried by said first spindle means will effect rotation of the gear carried by said second spindle means so that deviations in the tooth form of the work and master gears will result in relative rotation between said second spindle means and the gears carried thereby.

2. The structure defined in claim 1 which includes resilient means resiliently urging one side of the teeth of the gear mounted on the second spindle means against a given side of the teeth of the gear mounted on the first spindle means.

3. The structure defined in claim 2 wherein the resilient means comprises a coil spring member connected at one end to the gear mounted on the second spindle means and at the other end to a circumferentially spaced portion of second spindle means.

4. The structure defined in claim 2 wherein said sensing means comprises a transducer mounted on said second spindle means and having a feeler member actuated by relative movement of the gear mounted on said second spindle means.

5. The structure of claim 1 wherein said motive control means includes decoding means to decode a program source, a numerically controlled power unit operatively connected to said decoding means and said first, second and third motors and a program source carrying a predetermined program for operation of said first, second and third motors whereby actuation and operation of said first, second and third motors will be in accordance with the predetermined program carried by said program source.

6. The structure defined in claim 5 wherein the decoding means comprises a tape reader and the program source comprises a punched tape.

References Cited
UNITED STATES PATENTS

| | | | |
|---|---|---|---|
| 1,374,698 | 4/1921 | Wilkinson | 33—179.53 |
| 2,514,716 | 7/1950 | Muller | 33—179.53 |
| 2,687,576 | 8/1954 | Mahr | 33—179.53 |
| 2,835,042 | 5/1958 | Tandler et al. | 33—174 |
| 3,096,590 | 7/1963 | Stepanek | 33—179.53 |

SAMUEL S. MATTHEWS, *Primary Examiner.*